United States Patent
Govardhanam (10) Patent No.: US 12,105,205 B2
(45) Date of Patent: Oct. 1, 2024

(54) ATTRIBUTING SENSOR REALISM GAPS TO SENSOR MODELING PARAMETERS

(71) Applicant: GM Cruise Holdings LLC, San Francisco, CA (US)

(72) Inventor: Hariprasad Govardhanam, Fremont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 59 days.

(21) Appl. No.: 17/993,650

(22) Filed: Nov. 23, 2022

(65) Prior Publication Data

US 2024/0168169 A1 May 23, 2024

(51) Int. Cl.
| | |
|---|---|
| G01S 17/931 | (2020.01) |
| G01S 7/40 | (2006.01) |
| G01S 7/497 | (2006.01) |
| G01S 13/931 | (2020.01) |

(52) U.S. Cl.
CPC ............. *G01S 17/931* (2020.01); *G01S 7/40* (2013.01); *G01S 7/497* (2013.01); *G01S 13/931* (2013.01)

(58) Field of Classification Search
CPC ...... G01S 13/867; G01S 13/726; G01S 13/89; G01S 17/88; G01S 17/06; G01S 17/931
See application file for complete search history.

(56) References Cited

U.S. PATENT DOCUMENTS

| | | | |
|---|---|---|---|
| 11,922,703 B1* | 3/2024 | Saggu | G06V 20/58 |
| 2019/0049242 A1* | 2/2019 | Adams | G01B 21/16 |
| 2020/0184259 A1* | 6/2020 | Viswanathan | G06F 18/22 |
| 2020/0272148 A1* | 8/2020 | Karasev | G01S 17/86 |
| 2022/0161815 A1* | 5/2022 | Van Beek | G06N 20/00 |

* cited by examiner

*Primary Examiner* — Mirza F Alam (57) ABSTRACT

The disclosed technology provides solutions for measuring sensor realism (or fidelity) and in particular, provides methods for quantitatively determining how various sensor modeling parameters contribute to an associated fidelity metric. In some aspects, a process of the disclosed technology includes steps for receiving a first set of sensor data, determining a first fidelity score for the first set of sensor data, and processing the first set of sensor data using a perturbation algorithm to generate a second set of sensor data. In some aspects, the process can further include steps for determining a second fidelity score for the second set of sensor data. Systems and machine-readable media are also provided.

17 Claims, 7 Drawing Sheets

ATTRIBUTING SENSOR REALISM GAPS TO SENSOR MODELING PARAMETERS

BACKGROUND

1. Technical Field

The disclosed technology provides solutions for measuring sensor realism (or fidelity) and in particular, provides methods for quantitatively determining how various sensor modeling parameters contribute to an associated fidelity metric.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras, Light Detection and Ranging (LiDAR) sensors, and/or Radio Detection and Ranging (RADAR) disposed on the AV. In some instances, the collected data can be used by the AV to perform tasks relating to routing, planning and obstacle avoidance.

BRIEF DESCRIPTION OF THE DRAWINGS

Certain features of the subject technology are set forth in the appended claims. However, the accompanying drawings, which are included to provide further understanding, illustrate disclosed aspects and together with the description explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring certain concepts.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The training and testing of an autonomous vehicle (AV) software stack can require large quantities of training data. However, it can be difficult to generate the necessary quantities of training data through sensor data collection of real-world driving scenarios. To overcome the limitations of some AV sensor data collection techniques, AV training and testing can be performed in a simulated (also referred to as virtual or synthetic) environment that emulates real-world driving scenarios encountered by an AV. For example, the simulated environment can include recreations of roadways, intersections, buildings, as well as dynamic entities, such as other traffic participants (e.g., vehicles) and/or pedestrians, etc.

One limitation in the use of simulated environments for AV training and testing applications is that it is difficult to accurately recreate real-world scenarios in the simulated environment. For example, simulated environments that are based on recorded AV sensor data (e.g., bag data) can contain features and/or objects that do not accurately model their corresponding real-world features and/or objects with high fidelity. In some instances, divergences between real-world objects/features and their digital/virtual counterparts can be due to sensor noise, or due to errors in the processing pipeline (e.g., asset material modeling and/or sensor modeling issues) used to generate the synthetic environment.

Aspects of the disclosed technology provide solutions for quantifying the fidelity (or realism) of simulated representations of real-world assets, e.g., using a fidelity score (or realism score). That is, the fidelity score can provide a numeric representation of how realistically a digital asset (e.g., an object or entity) represents a real-world counterpart. The fidelity score may be provided as a numeric output, e.g., on the interval [0, 1], where a score of '0' represents absolute or complete divergence between real and simulated asset pairs (e.g., no similarity), whereas a score of '1' represents perfect correspondence between real and simulated asset pairs (e.g., total similarity). By way of example, a simulated (virtual) representation of a bus may have a fidelity score of 0.9 indicating that sensor data collected for the virtual asset (the simulated bus) is almost indistinguishable from sensor data collected for a real-world bus.

In some approaches, fidelity scoring can be performed for various sets of sensor data, such as, simulated sensor data collected using different sensor modalities. For example, simulated LiDAR, RADAR, and/or camera sensor data can be evaluated using a fidelity score to indicate how realistically the data represent real-world scenarios. In some aspects, fidelity scoring can be performed using a machine-learning model, for example, that has been trained to distinguish between real-world sensor data and simulated sensor data. As discussed in further detail below, fidelity scoring can be based on a distance (e.g., a Euclidian distance) between feature embedding vectors for a given input sensor dataset, and data clusters representing real-world and/or simulated sensor data.

In some applications, fidelity scoring can provide a metric by which simulated environments, or simulated assets, can be evaluated for use in AV training and testing applications. For example, one extension of fidelity scoring is to facilitate the identification of sensor data parameters that may be contributing to (or detracting from) the realism of a particular set of sensor data. In such approaches, perturbation algorithms can be used to modify various parameters for a set of input sensor data, and used to determine how specific sensor parameters contribute to divergence (if any) in realism with respect to identical real-world assets. By quantifying sensor fidelity (or sensor realism), aspects of the disclosed technology provide metrics for measuring the quality of simulated environments/assets, as well provide solutions for identifying the cause of divergence between real-world and synthetic assets.

Figure 1:
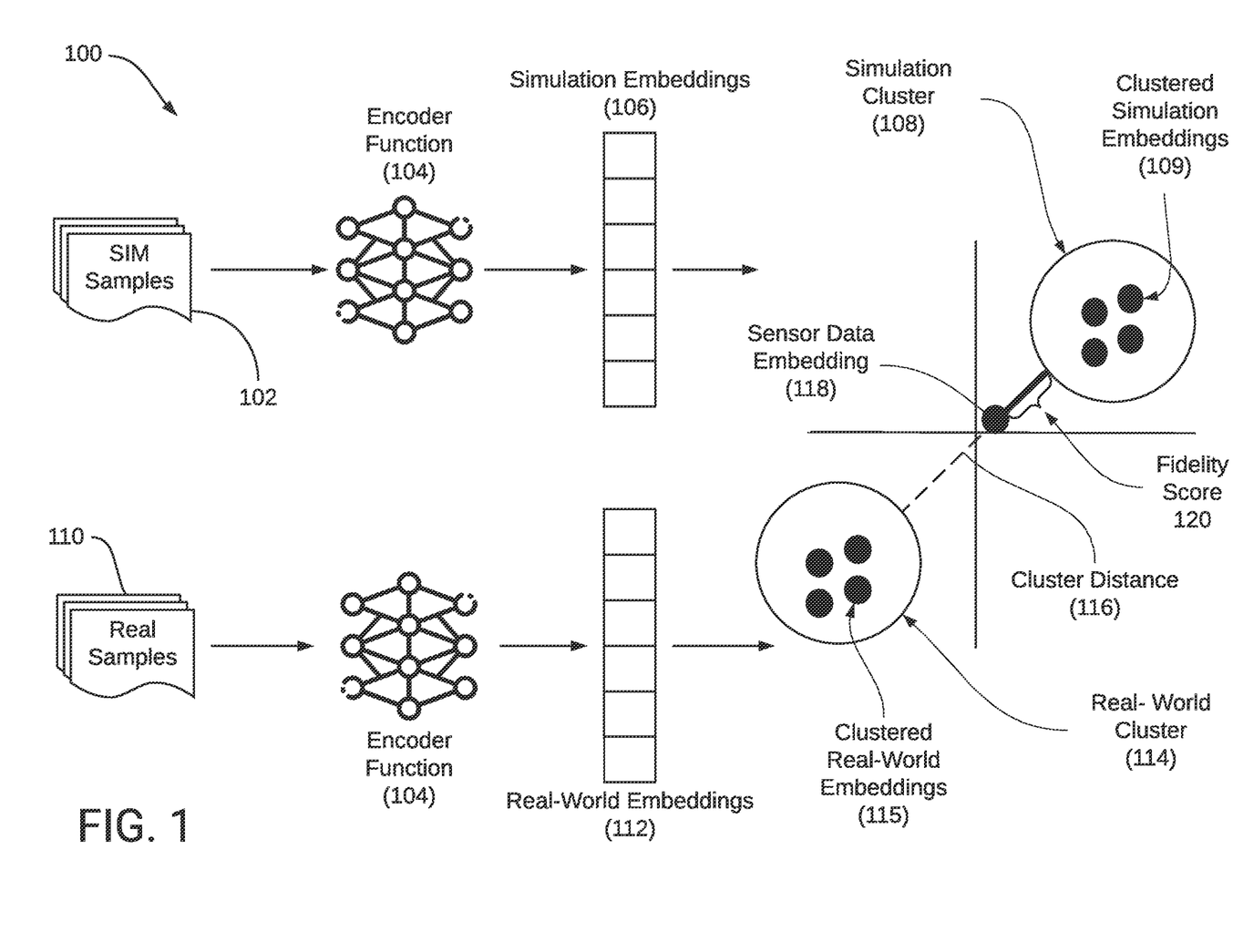
FIG. 1 conceptually illustrates a system for evaluating a sensor fidelity (or sensor realism) score for one or more sensory types, according to some aspects of the disclosed technology.

FIG. 1 conceptually illustrates a system 100 for evaluating a sensor fidelity (or sensor realism) score for one or more sensor input types. System 100 includes a set of simulated sensor data samples 102 which can be provided as input to a machine-learning (ML) model, such as ML model 104 (sometimes referred to as encoder function 104). In turn, ML model 104 can be configured to generate simulation embeddings 106 for each of the received sensor data samples 102. Simulation embeddings 106 can each be a vector representing a high-dimensional (e.g., greater than three dimensions) characterization of the corresponding (simulated) sensor data sample 102. For example, the simulation embeddings 106 can represent various characteristics of a given sensor data sample 102. The simulation embeddings 106, for each simulated sensor data sample 102, can be collectively represented by a data cluster, such as simulation cluster 108. That is, simulation cluster 108 may be a hypersphere cluster composed of various (multiple) clustered simulation embeddings 109, wherein each individual simulation embedding vector represents a corresponding simulated sensor data sample 102.

A similar clustering approach can be applied for real-world sensor data inputs. For example, real-world sensor data samples 110 can be provided to ML model 104 to produce corresponding real-world embeddings 112 for each of the data samples 110. The real-world embeddings 112 can then be clustered into a common cluster, e.g., real-world cluster 114 that is made up of multiple clustered real-world embeddings 115. In the example of FIG. 1, cluster distance 116 graphically represents the difference in characteristics between clustered simulation embeddings 109, collectively represented by simulation cluster 108, and clustered real world-embeddings 115, collectively represented by real-world cluster 114.

Once the simulation cluster 108 and real-world cluster 114 have been generated, a fidelity score for subsequent sensor data inputs can be calculated based on a distance between the resulting feature embedding for the subsequent sensor input and the simulation cluster 108 and/or the real-world cluster 114. By way of example, sensor data embedding 118 can represent a plotted feature embedding for a set of sensor data of unknown type (not illustrated), e.g., either from real-world sensor data or from simulated sensor data. In this example, a distance between the sensor data embedding 118 and the simulation cluster 108 can represent a fidelity score 120 that is associated with the sensor data embedding 118. In other approaches, a distance to the real-world cluster 114 may be used. In some implementations, fidelity score 120 may be based on distances between the sensor data embedding 118 and the simulation cluster 108, as well as distances between the sensor data embedding 118 and the real-world cluster 114. Depending on the desired implementation, the fidelity score 120 can be calculated as numeric output, e.g., on the interval [0, 1] where a '0' score would indicate a relatively low fidelity (or realism) score, suggesting a low degree of realism for the associated sensor data; in contrast, a '1' score would indicate a relatively high fidelity (or realism) score, suggesting a high degree of realism for the associated sensor data. In the illustrated example, sensor data embedding 118 is closer to the simulation cluster 108 (and farther from the real-world cluster 114), indicating that the associated sensor data is deemed to have a higher likelihood of being "simulated", e.g., originating from a simulated sensor operated in a simulated environment, as opposed to "real," e.g., originating from a physical sensor operated in a real-world environment (such as on a physical AV).

Figure 2:
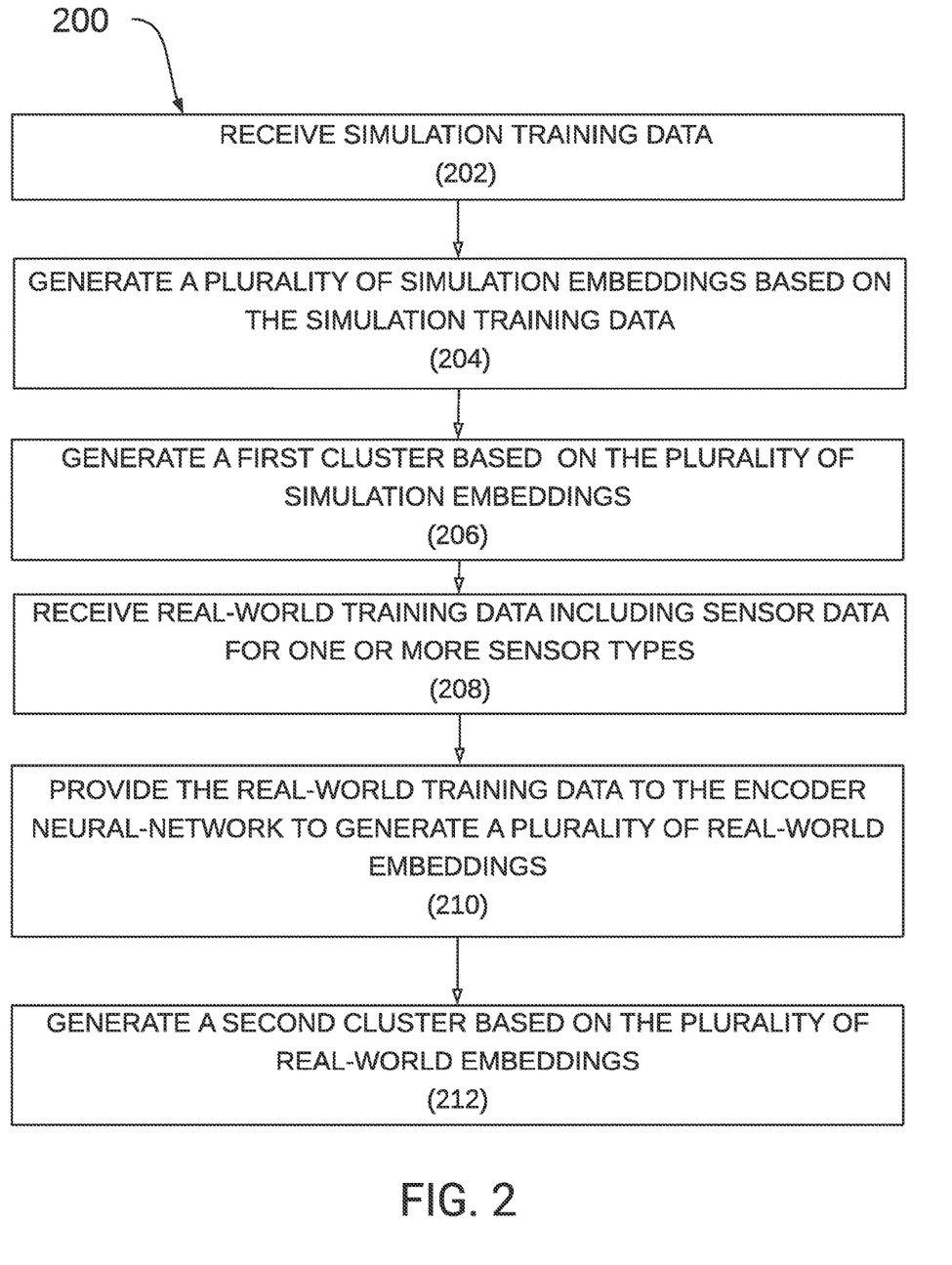
FIG. 2 illustrates a flow diagram of an example process for evaluating a sensor fidelity (or sensor realism) score for one or more sensory types, according to some aspects of the disclosed technology.

FIG. 2 illustrates a flow diagram of an example process 200 for evaluating a sensor fidelity (or sensor realism) score for one or more sensory types, according to some aspects of the disclosed technology.

At step 202, the process 200 includes receiving simulation training data, e.g., SIM samples 102, discussed above with respect to FIG. 1. Training data samples can include sets of simulated sensor data, as well as metadata tags indicating the simulated origin of the sensor data. The simulated simulation training data can include simulated sensor data for a variety of sensor modalities, including but not limited to simulated Light Detection and Ranging (LiDAR) sensor, simulated Radio Detection and Ranging (RADAR) sensors, simulated camera sensors, and the like.

At step 204, the process 200 includes generating a plurality of sensor embeddings based on the simulation training data. As discussed above, the simulation embeddings can be vectors that represent characteristics of a corresponding simulated sensor data set, such as simulation embeddings 106, discussed above. That is, the simulation embeddings can be vectors representing various characteristics of the input data, e.g., either synthetic sensor data or real-world sensor data.

In some approaches, the simulation embeddings can be generated using a machine-learning (ML) model, such as an encoder neural-network (e.g., encoder function 104) that has been trained to distinguish between real-world and simulated sensor data inputs. As discussed in further detail below with respect to FIG. 5, the ML model may be one that has been configured to utilize an error function that maximally separates classification categories (or clusters) as between real-world and simulated sensor data inputs.

At step 206, the process 200 can include generating a first cluster (e.g., a simulation cluster 108) based on the plurality of simulation embeddings. Depending on the desired implementation, various clustering approaches may be used to cluster the simulation embeddings. By way of example, various distance functions may be used to perform clustering, which may (or may not) include Euclidean distance functions. By way of example, clustering may be performed using a density-based clustering algorithm such as the Density-based spatial clustering of applications with noise (DBSCAN) algorithm, a centroid based clustering algorithm, a distribution-based clustering algorithm, a K-means clustering algorithm, and/or a distance-based clustering algorithm. Depending on the desired implementation, clustering algorithms of other types may be used, without departing from the scope of the disclosed technology.

At step 208, process 200 includes receiving real-world training data (e.g., real world sensor data samples 110) including sensor data for one or more senor types. The real-world training data can represent sensor data collected from one or more AV sensors, including but not limited to one or more cameras, LiDAR sensors, RADAR sensors, and the like. The real-world training data can include sensor data collected from any of a variety of real-world (physical) sensors, such as one or more AV sensors that are used during normal AV operations. In some aspects, the real-world training data can include metadata tags or labels indicating that the associated sensor data was collected from real-world (physical sensors).

At step 210, the real-world training data is provided to the ML model (e.g., encoder neural network 104) to generate a plurality of real-world embeddings. The resulting real-world embeddings can then be clustered to form a real-world cluster, such as real-world cluster 114, discussed above. Similar to the clustering discussed above with respect to the simulation embeddings various distance functions may be used to perform clustering, which may (or may not) include Euclidean distance functions. By way of example, clustering may be performed using a density-based clustering algorithm such as the Density-based spatial clustering of applications with noise (DBSCAN) algorithm, a centroid based clustering algorithm, a distribution-based clustering algorithm, a K-means clustering algorithm, and/or a distance-based clustering algorithm. Depending on the desired implementation, clustering algorithms of other types may be used, without departing from the scope of the disclosed technology.

Once the simulation cluster and real-world cluster have been generated, a fidelity score for subsequent sensor data inputs can be calculated based on a distance between the resulting feature embedding for the subsequent sensor input and the simulation cluster and/or the real-world cluster. Depending on the desired implementation, a fidelity score for subsequently received sensor data samples can be calculated as numeric output, e.g., on the interval [0, 1] where a '0' score would indicate a relatively low fidelity (or realism) score, suggesting a low degree of realism for the associated sensor data; in contrast, a '1' score would indicate a relatively high fidelity (or realism) score, suggesting a high degree of realism for the associated sensor data. By quantifying sensor fidelity (or sensor realism) of sensor data samples, the disclosed technology provide metrics (fidelity scores) for measuring the realism of simulated environments/assets, as well provide solutions for identifying the cause of divergence as between real-world and synthetic assets, as discussed in further detail below.

Figure 3:
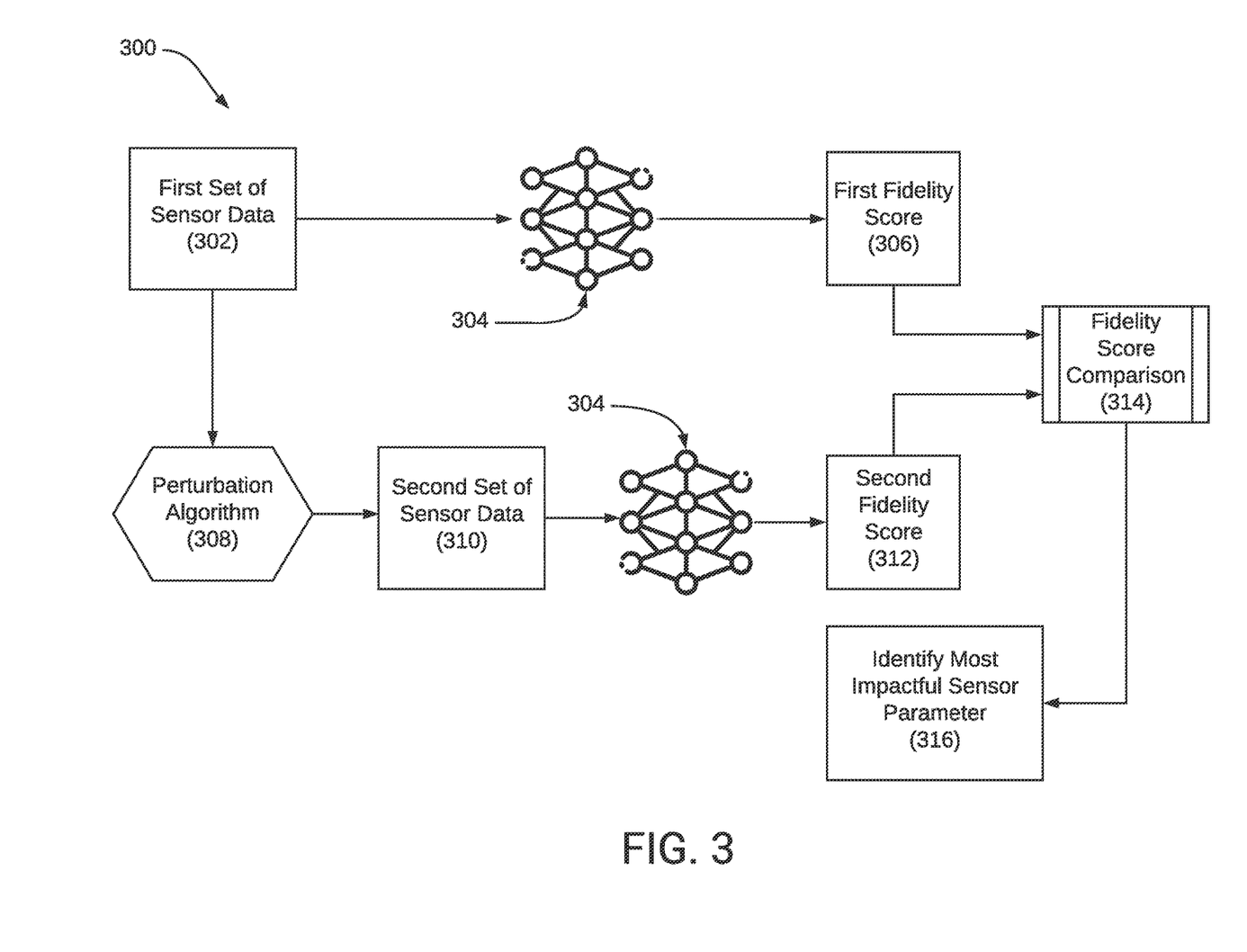
FIG. 3 conceptually illustrates a block diagram of an example system for identifying salient sensor parameters, e.g., for improving sensor fidelity or realism, according to some aspects of the disclosed technology.

FIG. 3 conceptually illustrates a block diagram of an example system 300 for identifying salient sensor parameters, e.g., for improving sensor fidelity or realism, according to some aspects of the disclosed technology. System 300 includes a process 302 for ingesting a first set of sensor data 302. The first set of sensor data can be simulated sensor data, for example that represents various features or objects in a simulated environment. By way of example, the first set of sensor data 302 may be simulated LiDAR data that includes point cloud information for various features of a simulated environment. The first set of sensor data 302 can be provided as an input to a ML model 304, such as an encoder neural network (e.g., encoder function 104), that is configured to generate/output a sensor fidelity/realism score (block 306).

In operation, system 300 can be configured to modify/perturb one or more sensor data parameters in the first set of sensor data 302 (at block 308), for example, to generate a second set of sensor data 310. Perturbation of sensor parameters can include modifying/adjusting data associated with various sensor measurement parameters. By way of example, for LiDAR sensor data, the perturbation algorithm 308 may be used to adjust/modify sensor data values associated with one or more of: an intensity value, a depth value, and/or a height value, e.g., for one or more points represented in the LiDAR sensor data. For image sensor data (e.g., collected using a camera), the perturbation algorithm 308 may be used to adjust one or more image parameters, including but not limited to a hue parameter, a saturation parameter, and/or a value (brightness) parameter, etc. The perturbation algorithm 308 can be used to adjust various parameters for other sensor data types (e.g., RADAR and/or time-of-flight sensors, etc.), without departing from the scope of the disclosed technology. Depending on the desired implementation the perturbation algorithm may utilize a deterministic approach, e.g., wherein various sensor data parameters are adjusted according to a pre-determined or predefined schedule or adjustment pattern. In other aspects, the perturbation may utilize a random (or pseudorandom) approach whereby the sensor data parameters are adjusted based on some degree of noise or randomness, e.g., that is received or sampled from a source external to the perturbation algorithm.

Once the second set of sensor data 310 has been generated using perturbation algorithm 308, the second set of sensor data 310 can be provided to the ML model 304, e.g., to generate a second fidelity score 312 that indicates a relatively fidelity (or realism) of the second set of sensor data 310. Once fidelity scores have been calculated for the original sensor input data (e.g., the first set of sensor data 302) and the modified sensor data (e.g., second set of sensor data 310), the fidelity scores of each can be compared (block 314) for example, to identify which sensor parameters are most impactful to the fidelity score (block 316).

By way of example, if the first set of sensor data 302 represents synthetic LiDAR data (e.g., sensor data collected from an emulated LiDAR sensor operated in a synthetic environment), then the perturbation algorithm 308 may modify one or more of sensor data parameters, e.g., by changing values relating to light intensity, depth, and/or height information for the first set of sensor data 302. If the data modifications performed by perturbation algorithm 308 result in a higher fidelity score, e.g., if the second fidelity score 312 is greater than the first fidelity score 306, then those senor parameters that are most impactful to the fidelity score can be identified, e.g., through regression analysis or other statistical techniques.

Figure 4:
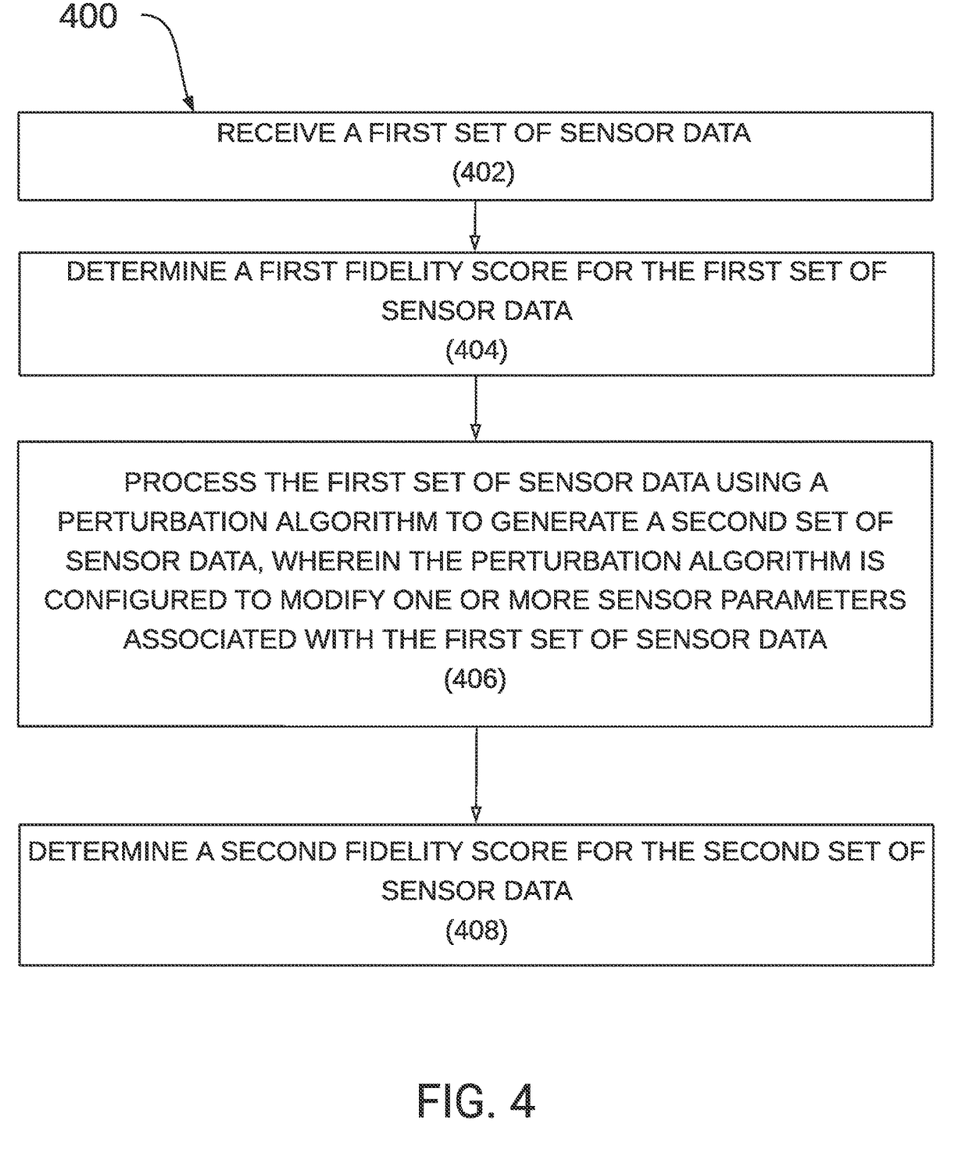
FIG. 4 illustrates a flow diagram of an example process for sensor parameter contribution to an overall sensor fidelity score, according to some aspects of the disclosed technology.

FIG. 4 illustrates a flow diagram of an example process 400 for sensor parameter contribution to an overall sensor fidelity score, according to some aspects of the disclosed technology. At step 402, the process 400 includes receiving a first set of sensor data. As discussed above, the sensor data can include data from any of a variety of synthetic sensor types, including but not limited to synthetic LiDAR sensors, synthetic RADAR sensors, synthetic camera sensors, and the like.

At step 404, the process 400 can include determining a first fidelity score for the first set of sensor data, such as the first set of sensor data 302, discussed above with respect to FIG. 3.

At step 406, the process 400 can include processing the first set of sensor data using a perturbation algorithm to generate a second set of sensor data, wherein the perturbation algorithm is configured to modify one or more sensor parameters associated with the first set of sensor data. In some implementations, the perturbation algorithm may be used to only modify one sensor parameter for a given set of sensor data at a time. By way of example, for camera image data, the perturbation algorithm may modify a hue value associated with the data, e.g., to generate the second set of sensor data. Depending on the desired implementation other (or additional sensor parameter information) may also be modified to generate the second set of sensor data.

At step 408, the process 400 includes determining a second fidelity score for the second set of sensor data. Once the second fidelity score is determined, the second fidelity score (for the second set of sensor data) can be compared to the first fidelity score (for the first set of sensor data), to determine how the sensor parameters modified by the perturbation algorithm contributed to the overall fidelity score. For example, if the fidelity score remained unchanged, it may be determined that the modified sensor parameters minimally contribute (or do not contribute) to the overall fidelity (realism) of the associated sensor data. Alternatively, if the fidelity score for the second set of sensor data is greatly increased (or decreased), then it may be determined that the modified sensor parameters impart large contributions to the realism/fidelity of the corresponding sensor data.

Figure 5:
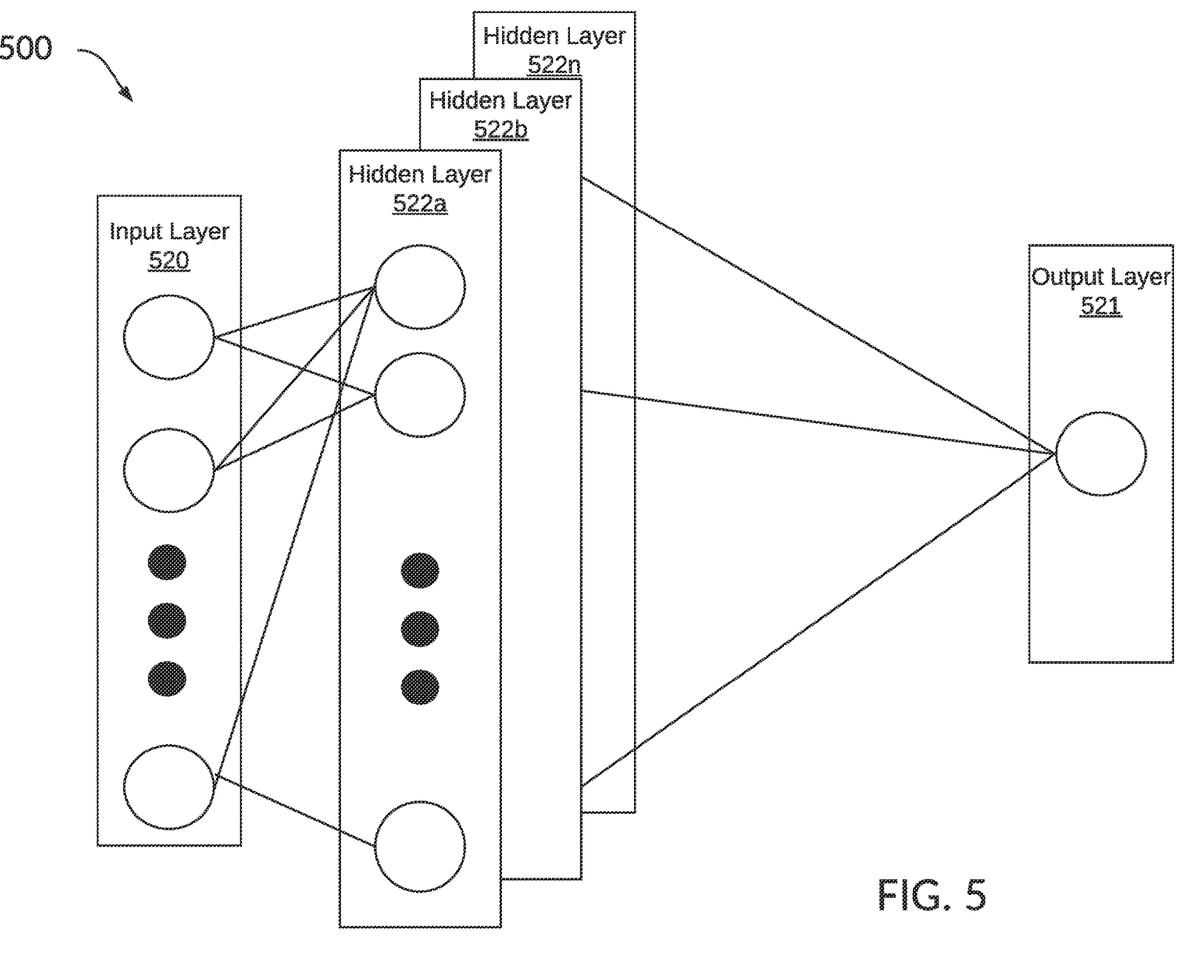
FIG. 5 illustrates an example architecture of a deep-learning neural network that can be used to compute a sensor fidelity score, according to some aspects of the disclosed technology.

FIG. 5 is an illustrative example of a deep learning neural network 500 that can be implemented to calculate or predict a sensor fidelity (or realism) score for a provided set of sensor input data. In one illustrative example, the input layer 520 can be configured to receive sensor data associated with a given AV sensor modality, such as a LiDAR sensor, a RADAR sensor, or a camera sensor, etc. The neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. The neural network 500 further includes an output layer 521 that provides an output resulting from the processing performed by the hidden layers 522a, 522b, through 522n.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes (e.g., node 526) in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521. In some cases, the neural network 500 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training data until the neural network 500 is trained well enough so that the weights of the layers are accurately tuned.

A loss function can be used to analyze error in the output. Any suitable loss function definition can be used, such as a Cross-Entropy loss. Another example of a loss function includes the mean squared error (MSE), defined as $E\_total = \Sigma(½(target-output)^2)$. The loss can be set to be equal to the value of $E\_total$. The goal of training is to minimize the amount of loss so that the predicted output is the same as the training label. The neural network 500 can perform a backward pass by determining which inputs (weights) most contributed to the loss of the network, and can adjust the weights so that the loss decreases and is eventually minimized. A derivative of the loss with respect to the weights (denoted as $dL/dW$, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w = w\_i - \eta \, dL/dW$, where w denotes a weight, wi denotes the initial weight, and η denotes a learning rate. The learning rate can be set to any suitable value, with a high learning rate including larger weight updates and a lower value indicating smaller weight updates.

The neural network 500 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, a deep belief nets (DBNs), a Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 6:
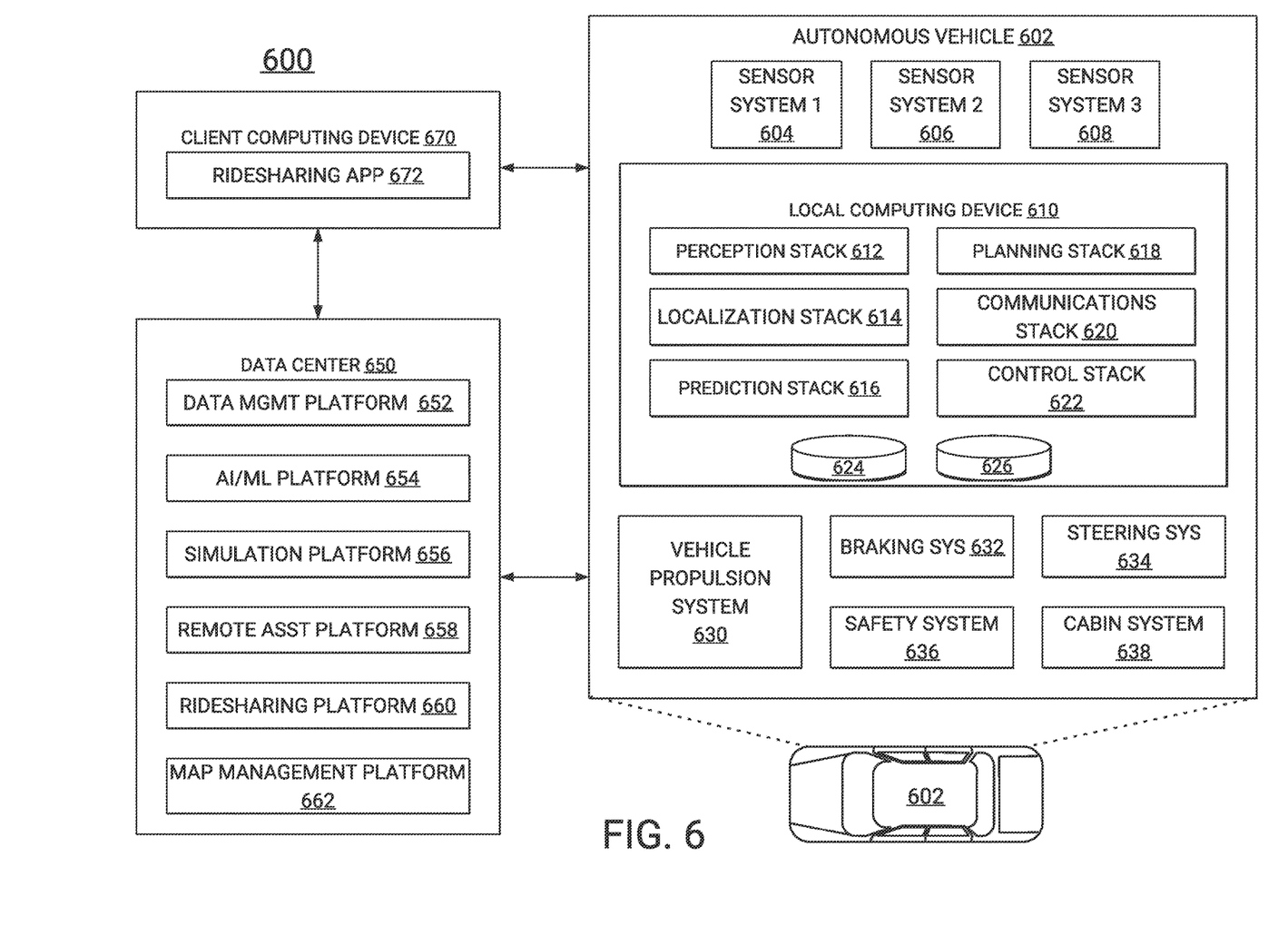
FIG. 6 illustrates an example system environment that can be used to facilitate AV dispatch and operations, according to some aspects of the disclosed technology.

FIG. 6 illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 150, and a client computing device 170. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), optical sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

The AV 602 can also include several mechanical systems that can be used to maneuver or operate the AV 602. For instance, the mechanical systems can include a vehicle propulsion system 630, a braking system 632, a steering system 634, a safety system 636, and a cabin system 638, among other systems. The vehicle propulsion system 630 can include an electric motor, an internal combustion engine, or both. The braking system 632 can include an engine brake, brake pads, actuators, and/or any other suitable componentry configured to assist in decelerating the AV 602. The steering system 634 can include suitable componentry configured to control the direction of movement of the AV 602 during navigation. The safety system 636 can include lights and signal indicators, a parking brake, airbags, and so forth. The cabin system 638 can include cabin temperature control systems, in-cabin entertainment systems, and so forth. In some embodiments, the AV 602 might not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

The AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a prediction stack 616, a planning stack 618, a communications stack 620, a control stack 622, an AV operational database 624, and an HD geospatial database 626, among other stacks and systems.

The perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 626, other components of the AV, and other data sources (e.g., the data center 650, the client computing device 670, third party data sources, etc.). The perception stack 612 can detect and classify objects and determine their current locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Mapping and localization stack 614 can determine the AV's position and orientation (pose) using different methods from multiple systems (e.g., GPS, IMUs, cameras, LIDAR, RADAR, ultrasonic sensors, the HD geospatial database 626, etc.). For example, in some embodiments, AV 602 can compare sensor data captured in real-time by sensor systems 604-608 to data in HD geospatial database 626 to determine its precise (e.g., accurate to the order of a few centimeters or less) position and orientation. AV 602 can focus its search based on sensor data from one or more first sensor systems (e.g., GPS) by matching sensor data from one or more second sensor systems (e.g., LIDAR). If the mapping and localization information from one system is unavailable, AV 602 can use mapping and localization information from a redundant system and/or from remote data sources.

Prediction stack 616 can receive information from localization stack 614 and objects identified by perception stack 612 and predict a future path for the objects. In some embodiments, prediction stack 616 can output several likely paths that an object is predicted to take along with a probability associated with each path. For each predicted path, prediction stack 616 can also output a range of points along the path corresponding to a predicted location of the object along the path at future time intervals along with an expected error value for each of the points that indicates a probabilistic deviation from that point.

Planning stack 618 can determine how to maneuver or operate AV 602 safely and efficiently in its environment. For example, planning stack 618 can receive the location, speed, and direction of AV 602, geospatial data, data regarding objects sharing the road with AV 602 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 602 from one point to another and outputs from the perception stack 612, localization stack 614, and prediction stack 616. Planning stack 618 can determine multiple sets of one or more mechanical operations that AV 602 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 618 can select from multiple backup plans to carry out. For example, while preparing to change lanes to turn right at an intersection, another vehicle may aggressively cut into the destination lane, making the lane change unsafe. The planning stack 618 could have already determined an alternative plan for such an event. Upon its occurrence, it could help direct AV 602 to go around the block instead of blocking a current lane while waiting for an opening to change lanes.

Control stack 622 can manage the operation of the vehicle propulsion system 630, the braking system 632, the steering system 634, the safety system 636, and the cabin system 638. Control stack 622 can receive sensor signals from the sensor systems 604-608 as well as communicate with other stacks or components of the local computing device 610 or a remote system (e.g., the data center 650) to effectuate operation of AV 602. For example, control stack 622 can implement the final path or actions from the multiple paths or actions provided by planning stack 618. This can involve turning the routes and decisions from planning stack 618 into commands for the actuators that control the AV's steering, throttle, brake, and drive unit.

Communications stack 620 can transmit and receive signals between the various stacks and other components of AV 602 and between AV 602, data center 650, client computing device 670, and other remote systems. Communications stack 620 can enable the local computing device 610 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 620 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

HD geospatial database 626 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 624 can store raw AV data generated by the sensor systems 604-608, stacks 612-622, and other components of AV 602 and/or data received by AV 602 from remote systems (e.g., data center 650, client computing device 670, etc.). In some embodiments, the raw AV data can include HD LIDAR point cloud data, image data, RADAR data, GPS data, and other sensor data that data center 650 can use for creating or updating AV geospatial data or for creating simulations of situations encountered by AV 602 for future testing or training of various machine learning algorithms that are incorporated in local computing device 610.

Data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. Data center 650 can include one or more computing devices remote to local computing device 610 for managing a fleet of AVs and AV-related services. For example, in addition to managing AV 602, data center 650 may also support a ridesharing service, a delivery service, a remote/roadside assistance service, street services (e.g., street mapping, street patrol, street cleaning, street metering, parking reservation, etc.), and the like.

Data center 650 can send and receive various signals to and from AV 602 and client computing device 670. These signals can include sensor data captured by the sensor systems 604-608, roadside assistance requests, software updates, ridesharing pick-up and drop-off instructions, and so forth. In this example, data center 650 includes a data management platform 652, an Artificial Intelligence/Machine Learning (AI/ML) platform 654, a simulation platform 656, a remote assistance platform 658, and a ridesharing platform 660, and a map management platform 662, among other systems.

Data management platform 652 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

AI/ML platform 654 can provide the infrastructure for training and evaluating machine learning algorithms for operating AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

Simulation platform 656 can enable testing and validation of the algorithms, machine learning models, neural networks, and other development efforts for AV 602, remote assistance platform 658, ridesharing platform 660, map management platform 662, and other platforms and systems. The simulation platform 656 can replicate a variety of driving environments and/or reproduce real-world scenarios from data captured by AV 602, including rendering geospatial information and road infrastructure (e.g., streets, lanes, crosswalks, traffic lights, stop signs, etc.) obtained from a cartography platform (e.g., map management platform 662); modeling the behavior of other vehicles, bicycles, pedestrians, and other dynamic elements; simulating inclement weather conditions, different traffic scenarios; and so on.

Remote assistance platform 658 can generate and transmit instructions regarding the operation of the AV 602. For example, in response to an output of the AI/ML platform 654 or other system of data center 650, remote assistance platform 658 can prepare instructions for one or more stacks or other components of AV 602.

Ridesharing platform 660 can interact with a customer of a ridesharing service via a ridesharing application 672 executing on client computing device 670. The client computing device 670 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing ridesharing application 672. Client computing device 670 can be a customer's mobile computing device or a computing device integrated with the AV 602 (e.g., the local computing device 610). The ridesharing platform 660 can receive requests to pick up or drop off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of data center 650. For example, the AI/ML platform 654 may incorporate the map viewing services for visualizing the effectiveness of various object detection or object classification models, simulation platform 656 may incorporate the map viewing services for recreating and visualizing certain driving scenarios, remote assistance platform 658 may incorporate the map viewing services for replaying traffic incidents to facilitate and coordinate aid, ridesharing platform 660 may incorporate the map viewing services into client application 672 to enable passengers to view AV 602 in transit en route to a pick-up or drop-off location, and so on.

Figure 7:
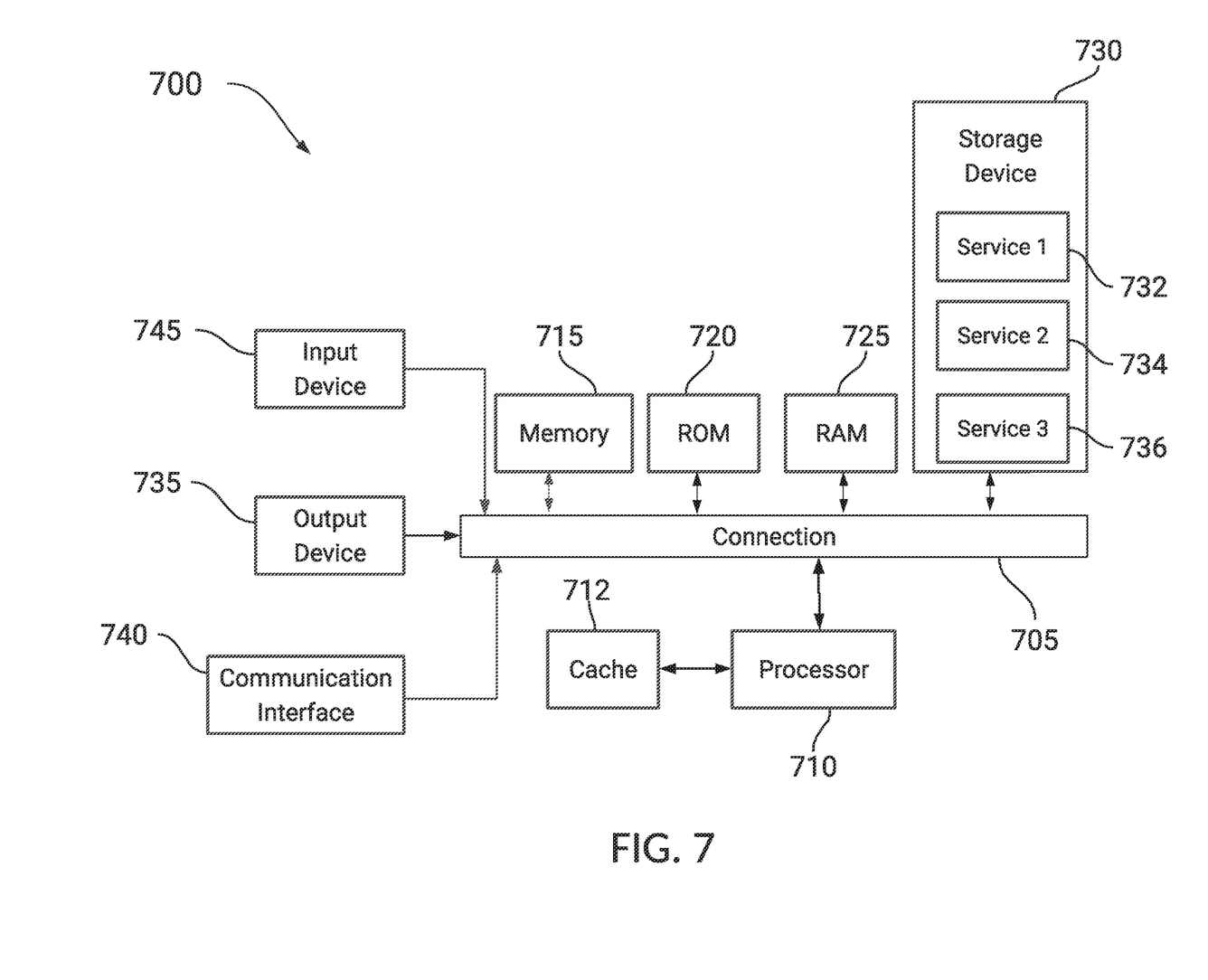
FIG. 7 illustrates an example processor-based system with which some aspects of the subject technology can be implemented.

FIG. 7 illustrates an example apparatus (e.g., a processor-based system) with which some aspects of the subject technology can be implemented. For example, processor-based system 700 can be any computing device making up internal computing system 610, remote computing system 650, a passenger device executing the rideshare app 670, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

Computing system 700 can be (or may include) a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An apparatus comprising:
   at least one memory; and
   at least one processor coupled to the at least one memory, the at least one processor configured to:
   receive a first set of sensor data from a sensor;
   determine a first fidelity score for the first set of sensor data;
   process the first set of sensor data using a perturbation algorithm to generate a second set of sensor data from the sensor, wherein the perturbation algorithm is configured to modify one or more sensor parameters for the sensor and associated with the first set of sensor data;
   determine a second fidelity score for the second set of sensor data; and
   automatically identify, based on the first fidelity score and the second fidelity score, at least one sensor parameter from among the one or more sensor parameters that most greatly affect an overall fidelity of the first set of sensor data.

2. The apparatus of claim 1, wherein the at least one sensor parameter comprises an intensity parameter.

3. The apparatus of claim 1, wherein the at least one sensor parameter comprises a hue parameter and a saturation parameter.

4. The apparatus of claim 1, wherein to determine the first fidelity score, the at least one processor is further configured to:
   provide the first set of sensor data to a machine-learning network, wherein the machine-learning network is configured to output a fidelity score based on the first set of sensor data.

5. The apparatus of claim 1, wherein the first set of sensor data comprises Light Detection and Ranging (LiDAR) data, and wherein the perturbation algorithm is configured to modify one or more of a height parameter, an intensity parameter, or a depth parameter with respect to the LiDAR data.

6. The apparatus of claim 1, wherein the first set of sensor data comprises camera image data, and wherein the perturbation algorithm is configured to modify one or more of a hue parameter, a saturation parameter, or a value parameter, with respect to the camera image data.

7. A computer-implemented method, comprising:
   receiving a first set of sensor data from a sensor;
   determining a first fidelity score for the first set of sensor data;
   processing the first set of sensor data using a perturbation algorithm to generate a second set of sensor data from the sensor, wherein the perturbation algorithm is configured to modify one or more sensor parameters for the sensor and associated with the first set of sensor data;
   determining a second fidelity score for the second set of sensor data; and
   automatically identifying, based on the first fidelity score and the second fidelity score, at least one sensor parameter from among the one or more sensor parameters that most greatly affect an overall fidelity of the first set of sensor data.

8. The computer-implemented method of claim 7, wherein the at least one sensor parameter comprises one or more of a height parameter, an intensity parameter, or a depth parameter.

9. The computer-implemented method of claim 7, wherein the at least one sensor parameter comprises one or more of a hue parameter, a saturation parameter, or a value parameter.

10. The computer-implemented method of claim 7, wherein determining the first fidelity score, further comprises:
    providing the first set of sensor data to a machine-learning network, wherein the machine-learning network is configured to output a fidelity score based on the first set of sensor data.

11. The computer-implemented method of claim 7, wherein the first set of sensor data comprises Light Detection and Ranging (LiDAR) data, and wherein the perturbation algorithm is configured to modify one or more of a height parameter, an intensity parameter, or a depth parameter with respect to the LiDAR data.

12. The computer-implemented method of claim 7, wherein the first set of sensor data comprises camera image data, and wherein the perturbation algorithm is configured to modify one or more of a hue parameter, a saturation parameter, or a value parameter, with respect to the camera image data.

13. A non-transitory computer-readable storage medium comprising at least one instruction for causing a computer or processor to:
  receive a first set of sensor data from a sensor;
  determine a first fidelity score for the first set of sensor data;
  process the first set of sensor data using a perturbation algorithm to generate a second set of sensor data from the sensor, wherein the perturbation algorithm is configured to modify one or more sensor parameters for the sensor and associated with the first set of sensor data;
  determine a second fidelity score for the second set of sensor data; and
  automatically identify, based on the first fidelity score and the second fidelity score, at least one sensor parameter from among the one or more sensor parameters that most greatly affect an overall fidelity of the first set of sensor data.

14. The non-transitory computer-readable storage medium of claim 13, wherein the at least one sensor parameter comprises one or more of a height parameter, an intensity parameter, or a depth parameter.

15. The non-transitory computer-readable storage medium of claim 13, wherein the at least one sensor parameter comprises one or more of a hue parameter, a saturation parameter, or a value parameter.

16. The non-transitory computer-readable storage medium of claim 13, wherein to determine the first fidelity score, the at least one instruction is further configured to cause the computer or processor to:
  provide the first set of sensor data to a machine-learning network, wherein the machine-learning network is configured to output a fidelity score based on the first set of sensor data.

17. The non-transitory computer-readable storage medium of claim 13, wherein the perturbation algorithm is configured to modify one or more of a height parameter, an intensity parameter, a depth parameter, a hue parameter, a saturation parameter, or a value parameter, with respect to the first set of sensor data.

* * * * *